US00RE43175E

(19) United States
(12) Reissued Patent
Sempliner et al.

(10) Patent Number: US RE43,175 E
(45) Date of Reissued Patent: Feb. 14, 2012

(54) TOOLLESS, SELF CLOSING FLOOR GROMMET CLOSURE FOR CABLE OPENINGS AND THE LIKE IN RAISED FLOORS OF DATA CENTERS OFFICE BUILDINGS AND OTHER AIR CONDITIONED STRUCTURES

(75) Inventors: Arthur T. Sempliner, Douglaston, NY (US); Jonathan Brill, San Francisco, CA (US); Kenneth Brill, Santa Fe, NM (US); Robert Sullivan, Morgan Hill, CA (US); William Pitt Turner, IV, Danville, CA (US)

(73) Assignee: Upsite Technologies, Inc., Santa Fe, NM (US)

(21) Appl. No.: 12/616,627

(22) Filed: Nov. 11, 2009 (Under 37 CFR 1.47)

Related U.S. Patent Documents

Reissue of:
(64) Patent No.: 6,632,999
Issued: Oct. 14, 2003
Appl. No.: 10/243,973
Filed: Sep. 13, 2002

U.S. Applications:
(62) Division of application No. 11/250,137, filed on Oct. 13, 2005, now Pat. No. Re. 41,863.

(60) Provisional application No. 60/318,763, filed on Sep. 13, 2001.

(51) Int. Cl.
*H02G 3/18* (2006.01)
*H05K 5/00* (2006.01)

(52) U.S. Cl. ..... 174/650; 174/153 G; 16/2.1; 52/27; 52/198; 52/204.1; 52/73; 52/192; 52/503; 29/623.2; 227/55; 49/365; 160/19

(58) Field of Classification Search ..... 174/650, 174/153 G, 152 R, 152 G, 151, 135, 659; 248/56; 16/2.1, 2.2; 439/604, 587, 274, 439/275; 277/55; 52/27, 198, 204.1, 73, 52/199, 19, 192, 273, 220.1, 503, 454, 220.7; 49/365; 160/19; 29/623.2; 227/55
See application file for complete search history.

(56) References Cited

U.S. PATENT DOCUMENTS
945,753 A 1/1910 Chamberlain et al.
(Continued)

FOREIGN PATENT DOCUMENTS
JP 9240303 A 9/1997
(Continued)

OTHER PUBLICATIONS
Doug Mockett & Company , Inc.; "Fine Architectural Hardware for Your Fine Furniture." New Concepts Supplement; (1997) 3 pages.
(Continued)

*Primary Examiner* — Angel R Estrada
(74) *Attorney, Agent, or Firm* — St. Onge Steward Johnston & Reens LLC

(57) ABSTRACT

A floor grommet for use in building and office structures supplied with air conditioning via under floor plenum. Directed flow of conditioned air is optimized by limiting the escape of air from the plenum into the space above the floor by leakage through floor openings provided for power cables, data cables and the like. Specialized floor grommets installed in the cable openings are comprised of a surrounding frame mounting sealing elements comprised of thin, flexible elements which are anchored at one end in the grommet frame and extend toward the center of the opening, from each side, to effectively close the opening against significant flow of conditioned air from the plenum below. Cables passing through the grommet opening cause minimal deflection of the flexible elements to limit the escape of conditioned air. Preferably, the resilient, flexible elements are filamentary in nature. To particular advantage, the filamentary sealing elements may be installed in multiple stages, with stages underneath being in contact with stages above, in outer portions thereof. Additionally, solid, van-like sealing elements may be provided to assist in centering of the cable elements, when cables are installed, and to provide a substantially complete seal, for those openings in which no cables are installed. The floor grommet of the invention is designed for initial or retrofit installation. Significant economies in the usage of conditioned air are realized when the floor grommets are employed.

19 Claims, 9 Drawing Sheets

U.S. PATENT DOCUMENTS

| | | | |
|---|---|---|---|
| 1,490,252 | A | 4/1924 | Bissell |
| 3,042,739 | A | 7/1962 | Craig |
| 3,434,273 | A | 3/1969 | Lovell |
| 3,778,529 | A | 12/1973 | Miller |
| D236,204 | S | 8/1975 | Cooper |
| 4,099,020 | A | 7/1978 | Kohaut |
| D268,895 | S | 5/1983 | Beleckis |
| 4,465,288 | A | 8/1984 | Kofoed et al. |
| 4,520,976 | A | 6/1985 | Cournoyer et al. |
| 4,678,075 | A | 7/1987 | Bowman, Jr. |
| D292,391 | S | 10/1987 | Schlesch |
| D298,494 | S | 11/1988 | Mockett |
| 4,905,428 | A | 3/1990 | Sykes |
| 5,041,698 | A | 8/1991 | Takagi et al. |
| 5,101,079 | A | 3/1992 | Rodrigues et al. |
| 5,195,288 | A | 3/1993 | Penczak |
| 5,392,571 | A | 2/1995 | Greenfield |
| 5,429,467 | A | 7/1995 | Gugle et al. |
| 5,440,841 | A | 8/1995 | Greenfield |
| 5,467,947 | A | 11/1995 | Quilling, II |
| 5,518,115 | A | 5/1996 | Latulippe |
| 5,546,895 | A | 8/1996 | Brown |
| 5,594,209 | A | 1/1997 | Nattel et al. |
| 5,628,157 | A | 5/1997 | Chen |
| 5,630,300 | A | 5/1997 | Chen |
| 5,727,351 | A | 3/1998 | Neathery et al. |
| 5,793,566 | A | 8/1998 | Scura et al. |
| 5,813,243 | A | 9/1998 | Johnson et al. |
| 5,994,644 | A | 11/1999 | Rindoks et al. |
| 6,102,229 | A | 8/2000 | Moncourtois |
| 6,149,164 | A | 11/2000 | Kreutz |
| 6,255,597 | B1 | 7/2001 | Bowling et al. |
| 6,265,670 | B1 | 7/2001 | Duesterhoeft et al. |
| 6,278,061 | B1 | 8/2001 | Daoud |
| 6,291,774 | B1 | 9/2001 | Williams |
| 6,316,725 | B1 | 11/2001 | Cole et al. |
| 6,430,882 | B1 | 8/2002 | Feldpausch et al. |
| 6,462,277 | B1 | 10/2002 | Young et al. |
| D469,410 | S | 1/2003 | Lyon |
| D472,325 | S | 3/2003 | Walker |
| 6,557,831 | B2 | 5/2003 | Erwin |
| 6,848,226 | B1 | 2/2005 | Boyd et al. |
| 7,126,059 | B2 | 10/2006 | Dinh et al. |

FOREIGN PATENT DOCUMENTS

| | | | |
|---|---|---|---|
| WO | 9905459 | A2 | 2/1999 |

OTHER PUBLICATIONS

Mockett; Doug Mockett & Company, Inc.; "Fine Architecture Hardware for Your Fine Furniture"; New Concepts Catalog No. 20; (2002); 3 pages.

"Wire Management"; Mockett.com; Document Obtained Prior to filing of of U.S. Appl. No. 11/250,137 (Oct. 13, 2005); 5 pages.

Woertz AG; Quotation dated Feb. 8, 2005 (4 pages).

Denco Techolologies with notation "Edition 2001" (3 pages).

Planchers Comey pamphlet, "Office Automation 2 Movable Raised Floor"; Document Obtained Prior to filing of U.S. Appl. No. 11/250,137 (Oct. 13, 2005); 4 pages with two attached photo enlargements.

Internet print of Forte B&B—Vertriebs—und Warenhandels GmbH; Document Obtained Prior to filing of of U.S. Appl. No. 11/250,137 (Oct. 13, 2005); 2 pages.

Internet Print of Uniflaireurope with Photo Enlargement; Document Obtained Prior to filing of of U.S. Appl. No. 11/250,137 (Oct. 13, 2005); 1 page.

Triton Technology Systems, Inc.; Complaint for Patent Infringement; Submitted by Helen Limoncelli on Jan. 4, 2005; 8 pages.

Daniel P. Roy, Jr. and Custom Plastic Distributors Inc.; Answer and Counterclaim; Civil Action No. 3:05 CV 14 (JBA); Submitted by Robert L. Rispoli on Mar. 2, 2005; 6 pages.

Triton Technology Systems, Inc.; Reply to Counterclaim; Civil Action No. 3:05 cv 14 (JBA); Submitted by Gene S. Winter on Mar. 18, 2005; 3 pages.

*Triton Technology Systems, Inc.* V. *Custom Plastic Distributors Inc. and Daniel P. Roy, Jr.;* Judgment on Consent; Civil Action No. 3:05 cv 14 (JBA); Judgment by Janet Bond Arterton, U.S.D.J. on Oct. 6, 2005; 3 pages.

Sealeze, Inc; Protest Under 37 C.F.R. 1.291(a); Filed Jul. 15, 2008 by Antonia M. Holland; 25 pages.

Upsite Technologies, Inc.; Complaint for Patent Infringement; Civil Action No. 6:08-CV-157(LED) Submitted by Camille Miller on Apr. 22, 2008; 26 pages.

Sealeze Inc.; Answer and Counterclaim; Civil Action No. 6:08-CV-157(LED) Submitted by Michael E. Jones on Jul. 1, 2008; 11 pages.

Upsite Technologies, Inc.; Answer and Affirmative Defenses to Sealeze, Inc.'s Counterclaims; Civil Action No. 6:08-CV-157(LED) Submitted by Camille Miller on Jul. 21, 2008; 4 pages.

Government of India Patent Office Examination Report No. 1; Application No. 575/DELNP/2004; May 31, 2010; 2 pages.

TOOLLESS, SELF CLOSING FLOOR GROMMET CLOSURE FOR CABLE OPENINGS AND THE LIKE IN RAISED FLOORS OF DATA CENTERS OFFICE BUILDINGS AND OTHER AIR CONDITIONED STRUCTURES

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,632,999. The reissue applications are applications Ser. No. 11/250,137, now U.S. Pat. No. Re. 41,863, and Ser. No. 12/616,627, (the present application) which are divisional reissues of U.S. Pat. No. 6,632,999. The present application claims the priority of the Oct. 13, 2005 filing date of reissue application Ser. No. 11/250,137.*

RELATED APPLICATIONS

This application claims priority of Provisional Application Ser. No. 60/318,763, filed Sep. 13, 2001.

BACKGROUND OF THE INVENTION

In certain building and office structures, it is advantageous to supply air conditioning by way of a raised floor structure forming an under floor plenum. By way of openings provided selectively in the flooring elements, the air conditioning flows are controllably directed into the room space or spaces above the floor. Such arrangements are widely employed in data centers, for example, but are also usefully employed to provide air conditioning on a controllable and efficient basis to modern offices.

Computers and related equipment utilized in offices, business, industry, government telecommunications, the internet, data storage facilities, and the like quite commonly are located in great numbers in dedicated buildings or dedicated areas of buildings, in which the equipment is arranged in relatively high density configuration, in racks, for example, for convenient supervision and maintenance. A common practice in connection with such high density data centers is to provide a raised floor structure made up of individual floor tiles supported on a suitable skeletal framework, providing a convenient plenum space underneath for the passage of cooling air and the necessary data and power cables. Suitable cable cut-outs or openings are provided in the floor tiles to accommodate the passage of the power and data cables from the space underneath the floor upward for connection to the computer units within the room above. Typically, large numbers of such cable openings are provided. For example, there may well be as many as sixty cable openings (of a typical size of about 4"×8") per thousand square feet of floor space.

Because the set up and operation of the computer equipment within a large data center can be very dynamic, in order to accommodate the rapid growth and change within the industries served, it is necessary not only to have relatively large numbers of grommet openings, but also that they be conveniently accessed and used in order to facilitate frequent re-routing of power and data cables.

In the operation of high density data centers, significant heat is generated by the operating units, and it is necessary to provide suitable air conditioning in order to maintain the equipment at a suitable operating temperature. Conventionally, the necessary air conditioning is provided by discharging cool air into the cable space provided below the elevated floor structure. Selected perforated floor tiles, provided with a desired pattern of openings, are appropriately positioned in relation to the operating units, sometimes directly beneath, and sometimes alongside, arranged to discharge cooled air upwardly, where the air may be drawn into the operating units by their internal fans.

The air conditioning of the operating units is complicated significantly by the presence of large numbers of cable openings throughout the floor space. Large quantities of the cool air escape through these large openings into the general ambient of the room, where the cool air cannot be efficiently utilized. The escape of conditioned air through the cable openings can be such as to reduce the static pressure in the cable space underneath the floor from a desired 0.10" of water, for example, to as little as 0.01". While this "lost" cooling air does enter the ambient space of the data center, it is not effectively and efficiently available to be drawn into the operating units, and often simply mixes with hot air being discharged from the operating units by their internal cooling fans. The loss of efficiency can be as great as the equivalent of a 20 ton cooling unit for each thousand square feet of computer room floor space.

Some attempts have been made to reduce the loss of conditioned air through floor openings, by stuffing the openings with foam pads, rags, small pillows, etc. These have been haphazard at best and generally of minimal usefulness.

In a similar manner, controlled air conditioning of modern office space is sometimes accomplished by providing the conditioned air via an under floor plenum associated with a swirled diffuser supply system, with selectively located under floor diffusers and floor grates to provide for controlled upward discharge of the conditioned air into the office space. Such arrangements often seek to increase efficiency by providing for a swirling action of the discharged air, a technique that tends to provide for equivalent comfort levels while maintaining the ambient temperature at least slightly higher than otherwise, to achieve greater air conditioning efficiencies. For such systems, uncontrolled leakage of conditioned air through cable openings and the like provided in the flooring can reduce the operating efficiencies of the system, and a need is indicated for efficient means for sealing such openings.

SUMMARY OF THE INVENTION

The present invention relates to a novel and improved form of floor grommet for use in large, high density data centers, under floor office air conditioning and the like, which substantially seals off the cable openings around the power and data cables or other elements passing therethrough. There is thus a minimal loss of cooling air through the multiple cable openings and a maximized flow of such air is directed through the intended discharge openings, e.g., adjacent to and/or underneath the operating units, or through special outlets to provide a desired swirling action. In a particularly preferred embodiment of the invention, a standard cable opening of 4"×8" or 5"×8" dimensions is "sealed" by a plurality of thin filamentary elements extending from opposite sides of a grommet frame and meeting in the central area of the grommet opening. The density of these filamentary elements is such that power and data cables may be easily threaded through the grommet opening by displacement of the elements, which then largely close around the cables to minimize any opening for the escape of conditioned air. To a particular advantage, the filamentary elements may be provided by brush-like bristle assemblies, formed of relatively fine bristles of materials such as nylon, polypropylene or natural horsehair.

In a particularly advantageous form of the invention, a plurality of layers of the bristle assemblies of different lengths and configurations are provided within a grommet frame. A first layer of opposed bristles extends from one side of the grommet frame, meeting in the center of the grommet opening. A second layer of bristles is disposed directly below the first, and advantageously consists of bristles of a somewhat shorter length which do not extend completely to the center of the grommet opening. Advantageously, the two levels of bristles are disposed so that the shorter bristles and the longer bristles are in contact in their outer areas.

For a more complete understanding of the above and other features and advantages of the invention, reference should be made to the following detailed description of preferred embodiment to the invention and to the accompanying drawings.

DESCRIPTION OF PREFERRED EMBODIMENTS

Figure 1:
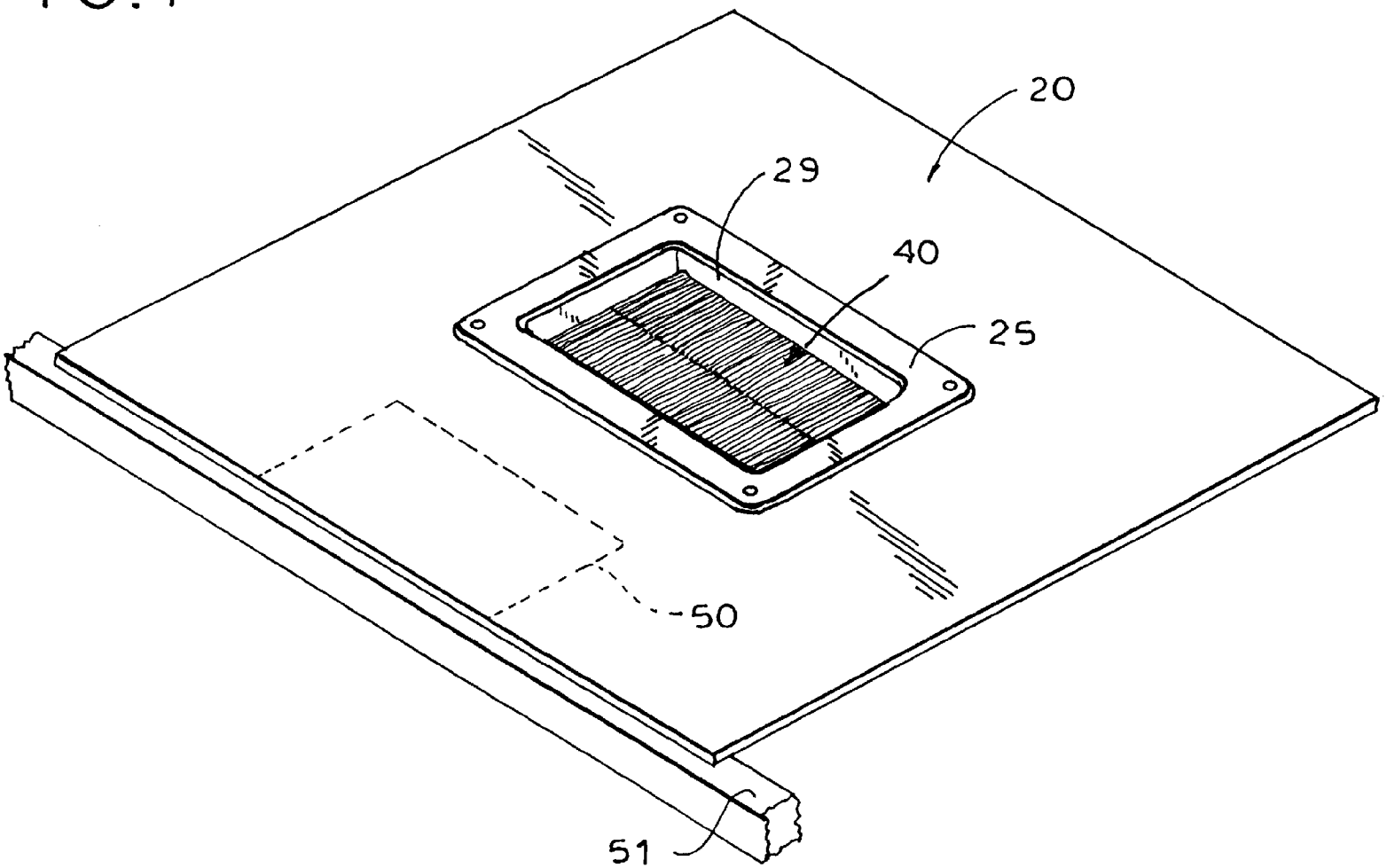
FIG. 1 is a top perspective view of a typical form of floor tile of a raised floor system, illustrated with a floor grommet according to the invention installed therein.
Figure 2:
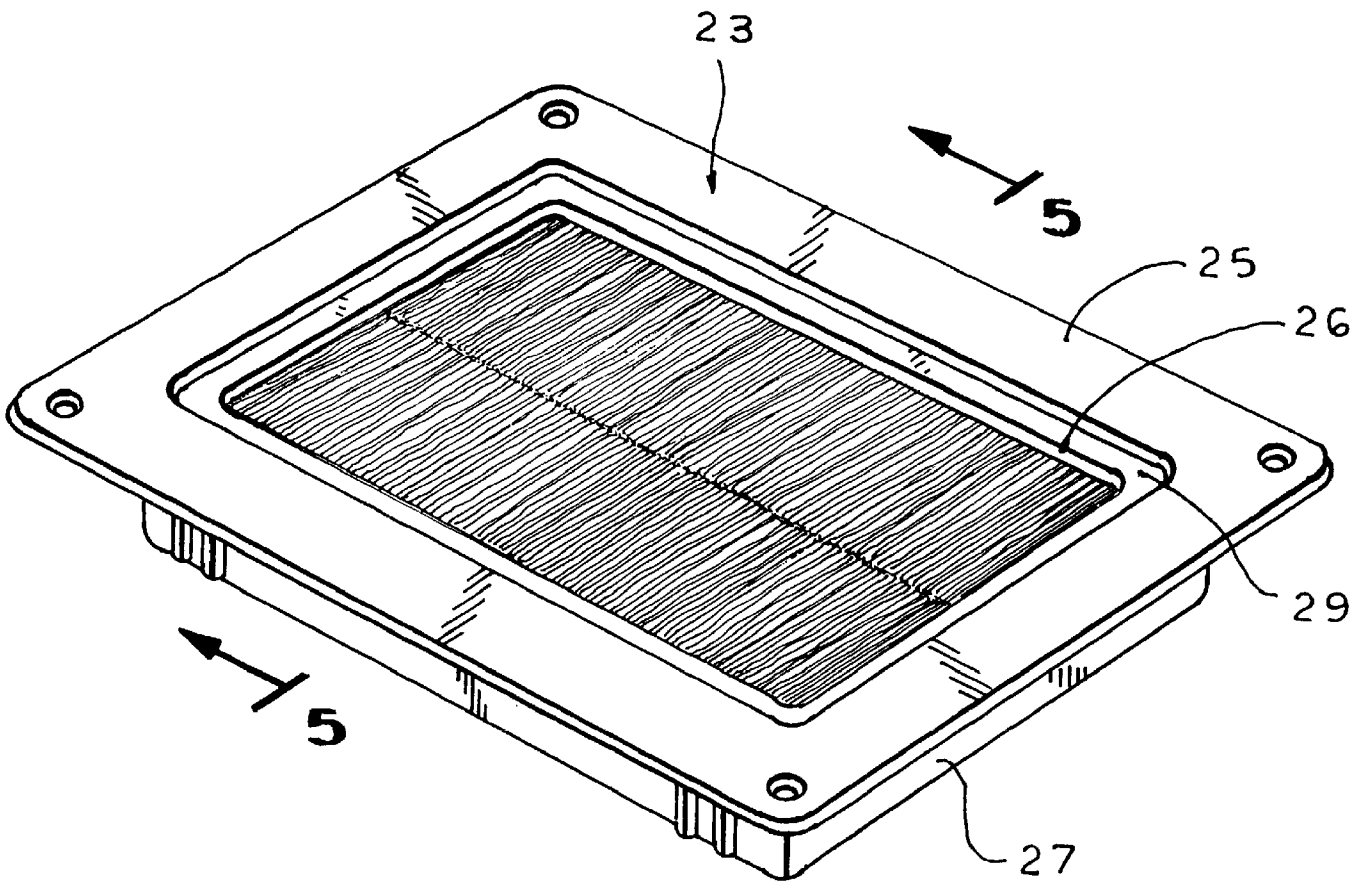
FIG. 2 is an enlarged top perspective view of a preferred embodiment of the new floor grommet.

Referring now to the drawings, the reference numeral 20 (FIG. 1), designates generally a typical floor tile utilized in raised floor installations. Known constructions of such raised floor structures are made available commercially by, for example, Tate Access Floors, Inc., Norwood, Mass. The individual floor tiles 20, typically flat on their upper surfaces, are formed with supporting structure 21 on their undersurfaces. The individual floor tiles may be supported by a grid structure engaging undersurfaces of the tiles at their edges, typically with supporting posts (not shown) supporting the grid structure at an elevated level from the base floor (not shown) of the enclosing structure. The particular type and style of raised floor structure does not form a part of this invention, and the description of such raised floor structures is simply to illustrate the environment in which the floor grommet system of the invention is employed.

In a typical installation, the floor tiles 20 may be approximately 2 feet square, and the entire elevated floor is made up of these tiles arranged edge to edge. Floor tiles and supporting structure have adequate strength to support all the necessary computer or office equipment, personnel, etc., typically involved in high density data centers, office buildings, and the like.

Figure 6:
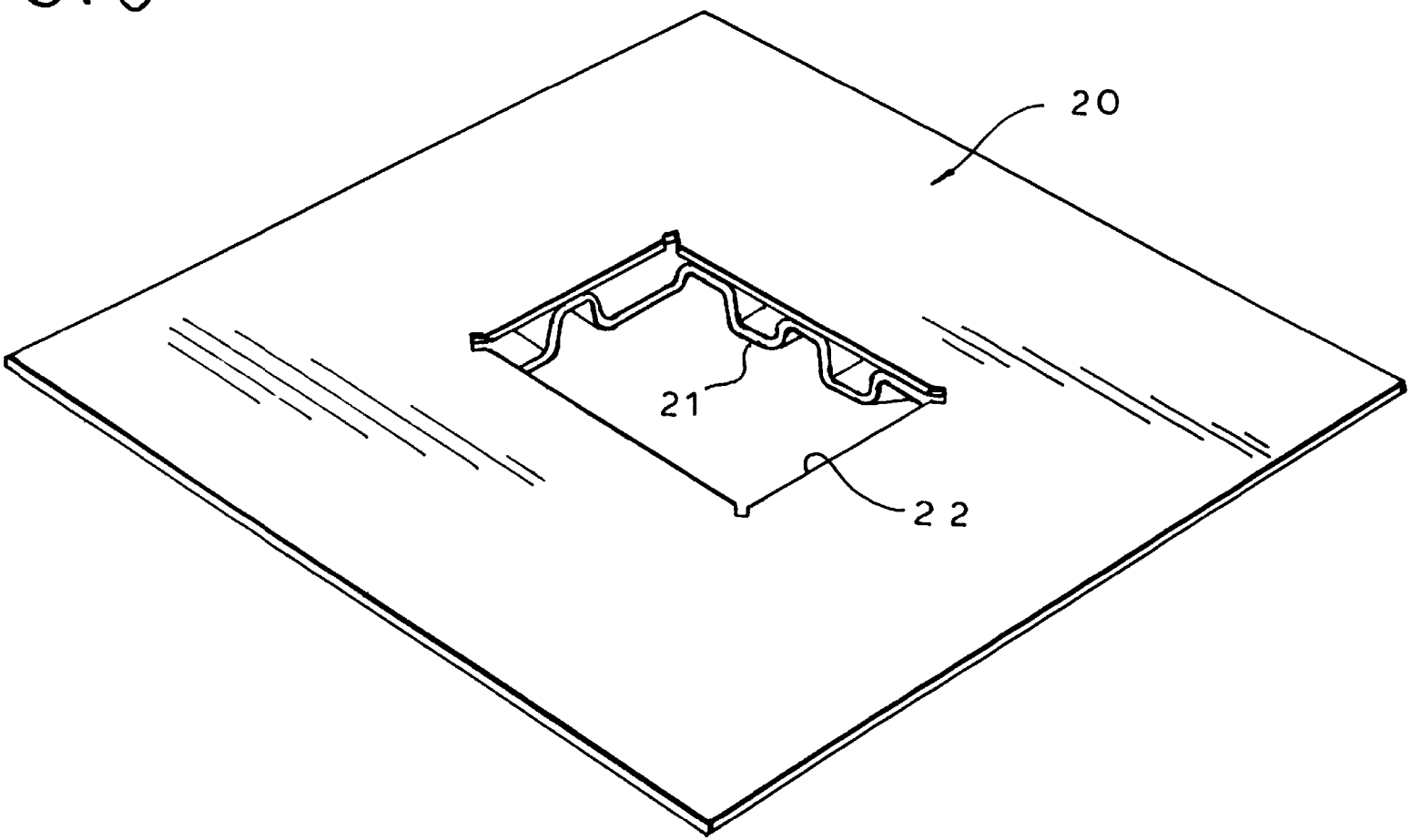
FIG. 6 is a top perspective view of a typical floor tile element shown with a central cable opening for receiving the floor grommet of the invention.
Figure 7:
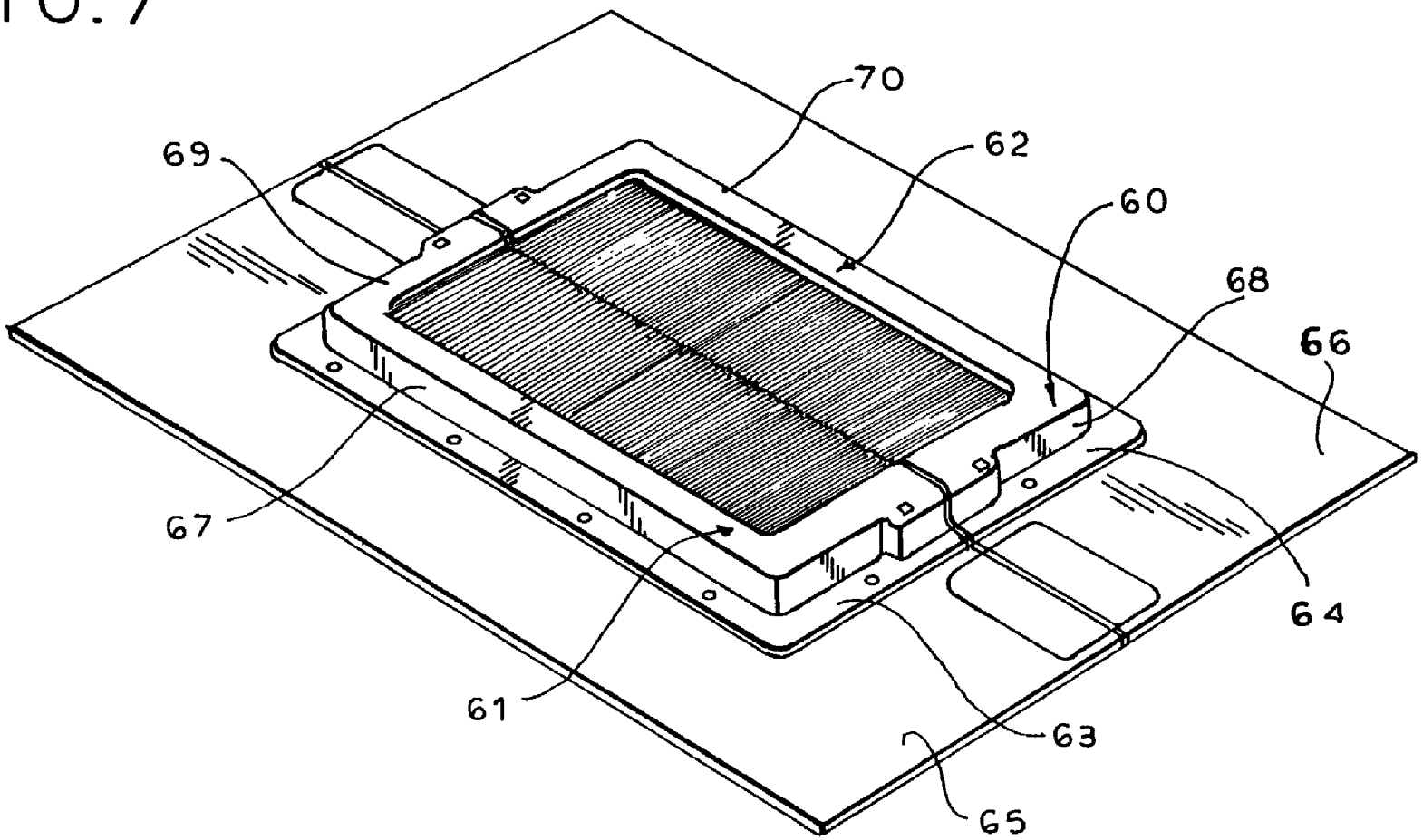
FIG. 7 is a top perspective view showing a modified form of the invention useful particularly in connection with retrofit installation of grommets in an elevated floor system.
Figure 8:
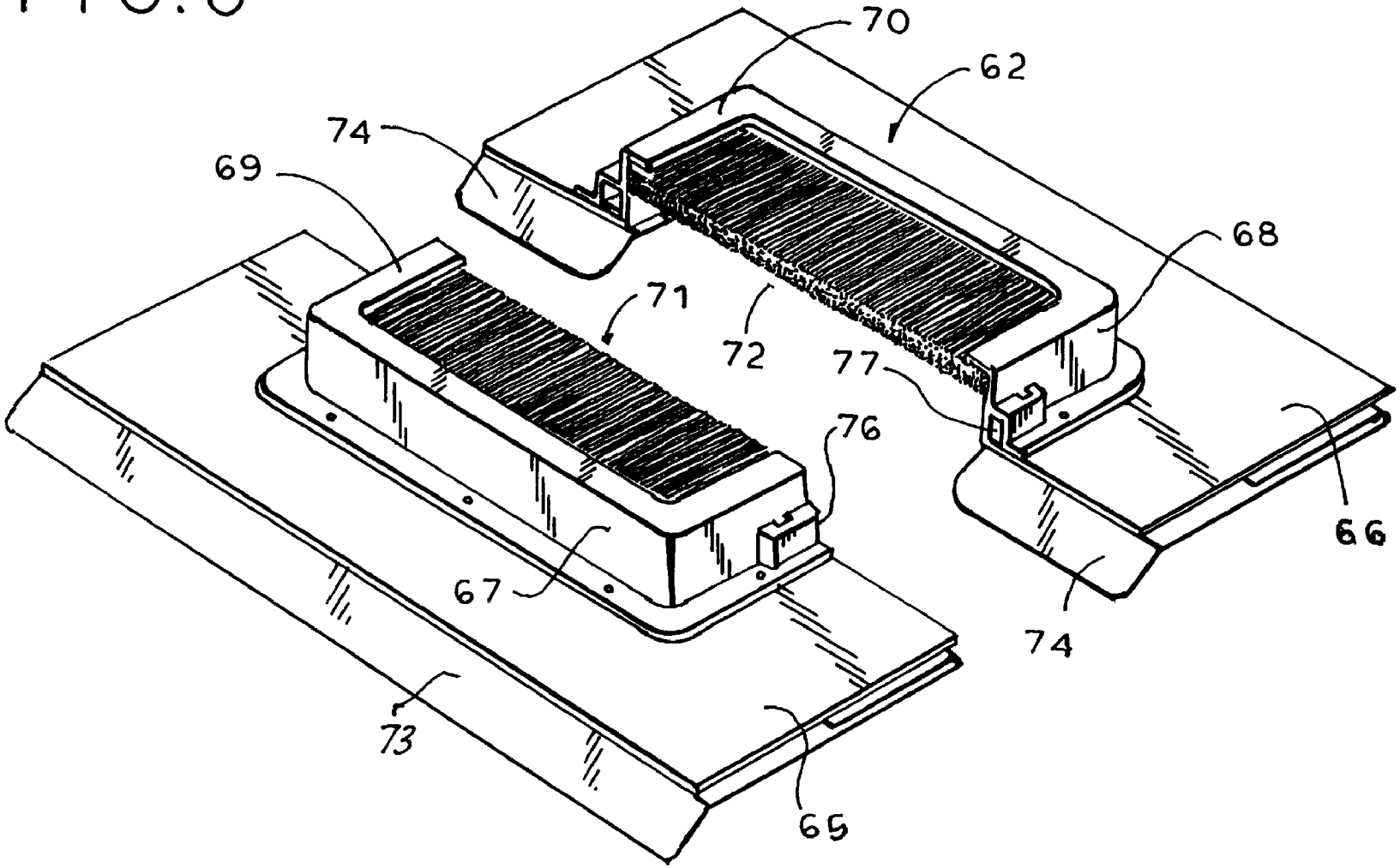
FIG. 8 is an exploded view of the retrofit device of FIG. 7.

In the illustration of FIG. 6, the floor tile 20 is shown with a center cable opening 22 to enable power and data cables to be passed from the space below the elevated flooring upward for connection to the various units of computer or other equipment installed in the office or data center. As previously mentioned, there may be a large number of such openings, as many as sixty openings per thousand square feet of floor space, in a typical data center, for example. In many cases, these openings are simply lined with a hole dressing material, to protect the cables from sharp metal edges, the holes otherwise being left open except perhaps for makeshift attempts to reduce airflow losses therethrough.

Pursuant to the present invention, the cable openings 22 are nominally closed by means of floor grommet assemblies 23, which are designed to be received in the cable openings and hence serve both to dress the opening and protect the cables from sharp edges, and also to effectively seal the openings against significant airflow. At the same time, the floor grommet units of the invention allow power and data cables to be easily passed through the floor openings and through the grommets, accommodating easy routing and re-routing of such cables as is frequently necessary in an active office data center.

To advantage, the floor grommet 23 of the invention comprises a surrounding frame 24, preferably formed of a structural plastic material, such as polypropylene, compounded to have anti-static characteristics as well as fire-retardant characteristics. The frame 24 has a cross-sectional configuration as reflected in FIG. 5, with a horizontal flange portion 25 defining a rectangular central opening 26, typically of 8"×5" dimensions. Peripheral flanges 27 project downward from the horizontal flange 25 and are of a suitable size and shape to cover the raw edges of the floor tiles 20.

In the specific illustration of FIG. 5, a special depending flange 28 is provided along one side, for purposes that will be described hereafter. In all other respects the features shown in FIG. 5 relate to the embodiment shown in FIGS. 1-4.

Figure 5:
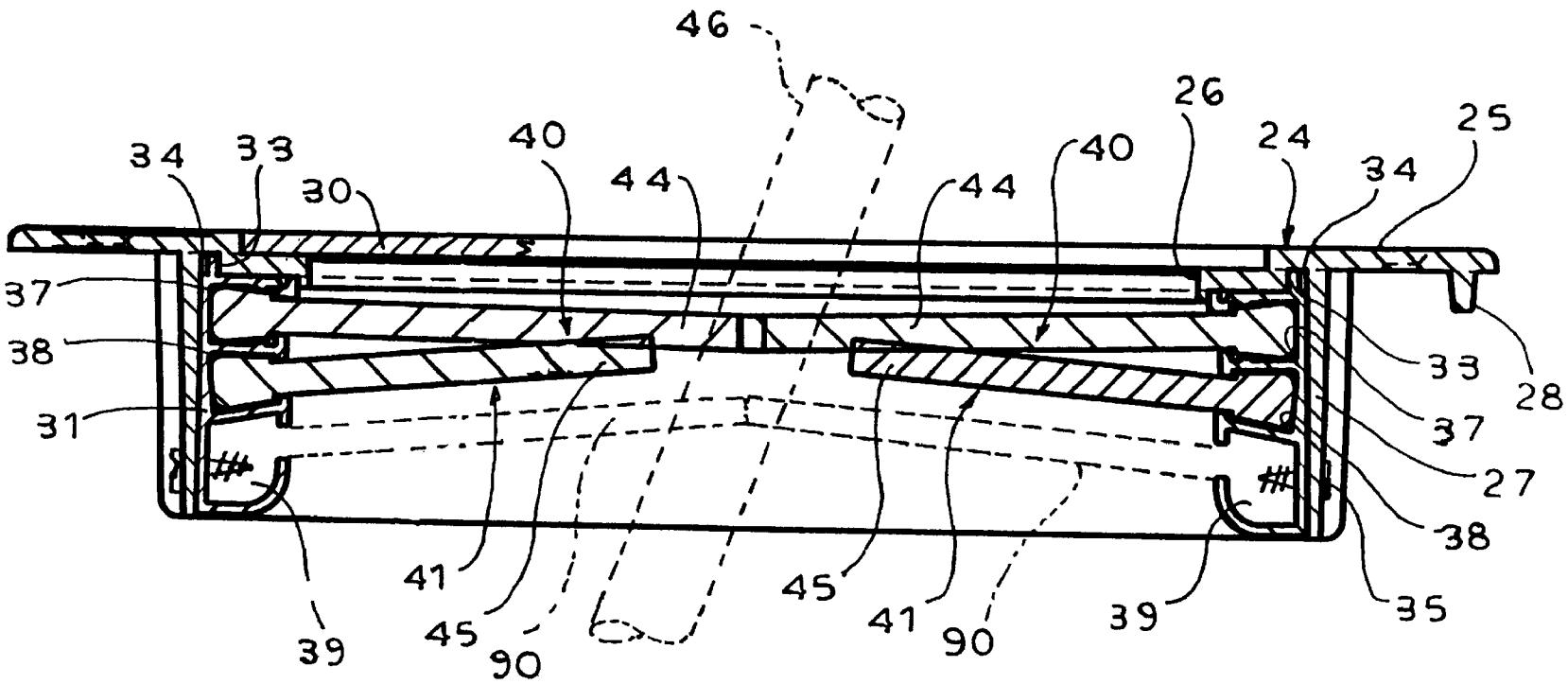
FIG. 5 is a cross-sectional view as if taken generally on line 5-5 of FIG. 2, illustrating a slightly modified form of grommet intended for installation at an edge of a floor tile.

Immediately surrounding the opening 26, the horizontal flange 25 is formed with an offset to define a rectangular recess 29 adapted to receive a cover plate 30, partially shown in FIG. 5. The cover plate 30 may be employed to completely close the opening 26 when no cables are extending therethrough, so that no air at all escapes through the opening, and the opening may be walked upon as if it were a normal part of the floor tile surface.

Along each of the longer sides of the vertical flanges 27, there are installed multiple channel extrusions 31, advantageously formed of aluminum. The channel forming extrusions are mounted along the inside walls of the vertical flanges 27. Upwardly extending locating ribs 33 are provided along upper edges of the channel forming extrusions and are received in recesses 34 formed in the frame 24. The channel forming extrusions are locked in place by means of screws 35 (FIG. 4) which extend through openings 36 in the side flanges 27 to secure the channel forming extrusions tightly against the insides of the flanges.

Figure 4:
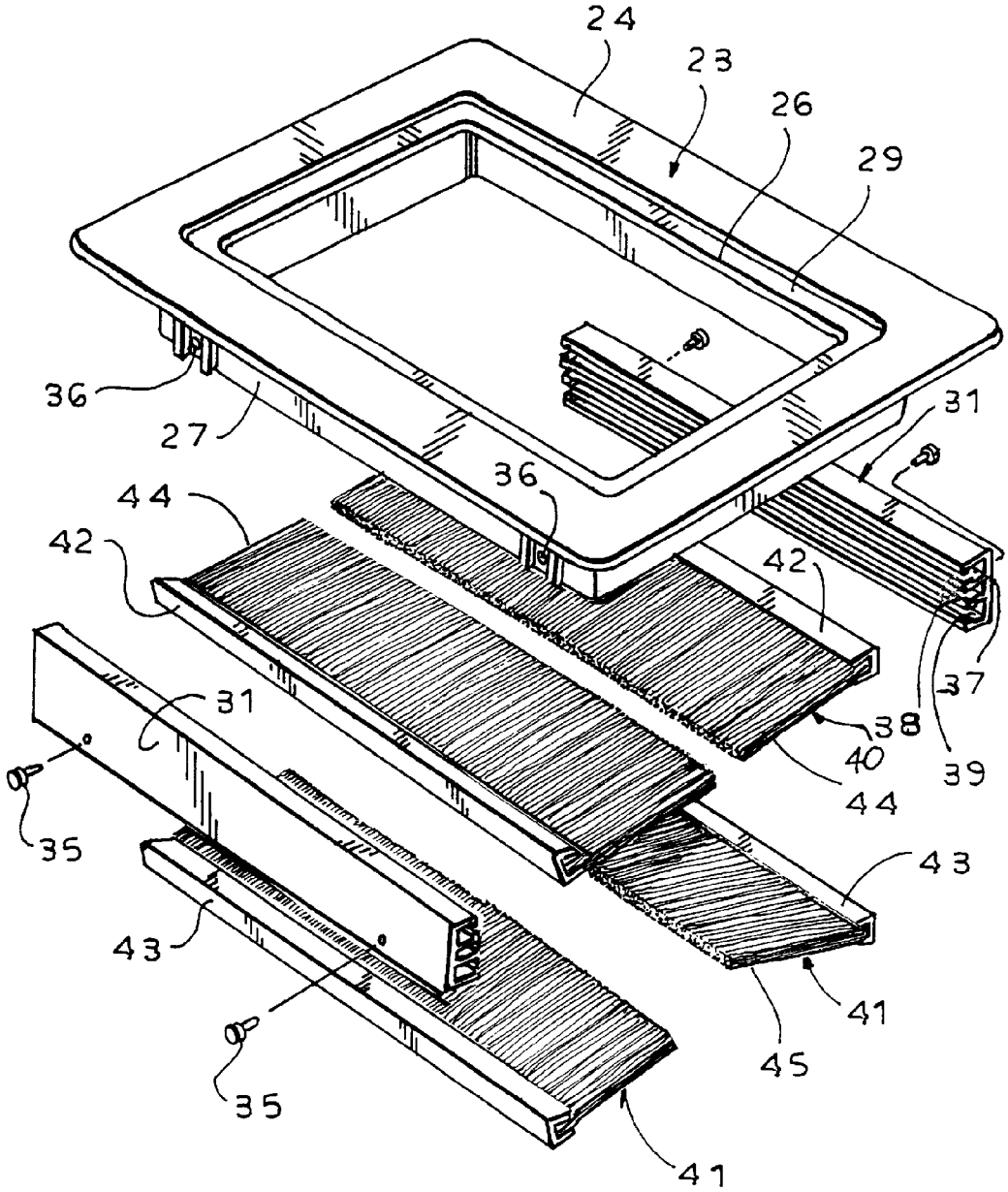
FIG. 4 is an exploded view of the floor grommet of FIG. 2.

As shown in FIGS. 4 and 5, the multi-channel extrusions of the preferred embodiment consist of three inwardly facing channels 37-39 which extend lengthwise of the extrusions.

The upper channels 3-38 are arranged to tightly receive upper and lower bristle assemblies 40-41.

The bristle assemblies 40-41 are comprised of backbone structures 42-43 which mount, and from which extend, a mass of fine, flexible filaments or bristles 44-45. To advantage, the bristles may be formed of nylon or polyethylene filaments, for example, having a thickness of 10-20 mils and compounded or treated to have anti-static and flame-retardant characteristics. The individual bristles are closely packed to a thickness of around one-fourth inch.

As evident in FIG. 5, the upper bristle assemblies 40 are disposed generally horizontally and incorporate bristles of a length to extend to, and preferably just slightly beyond the center line of the grommet opening 26. The arrangement is such that the upper bristle assemblies, in an undisturbed state, substantially close the grommet opening 26, forming a highly effective barrier against the flow of conditioned air under a pressure of, for example, 0.10" of water.

Figure 3:
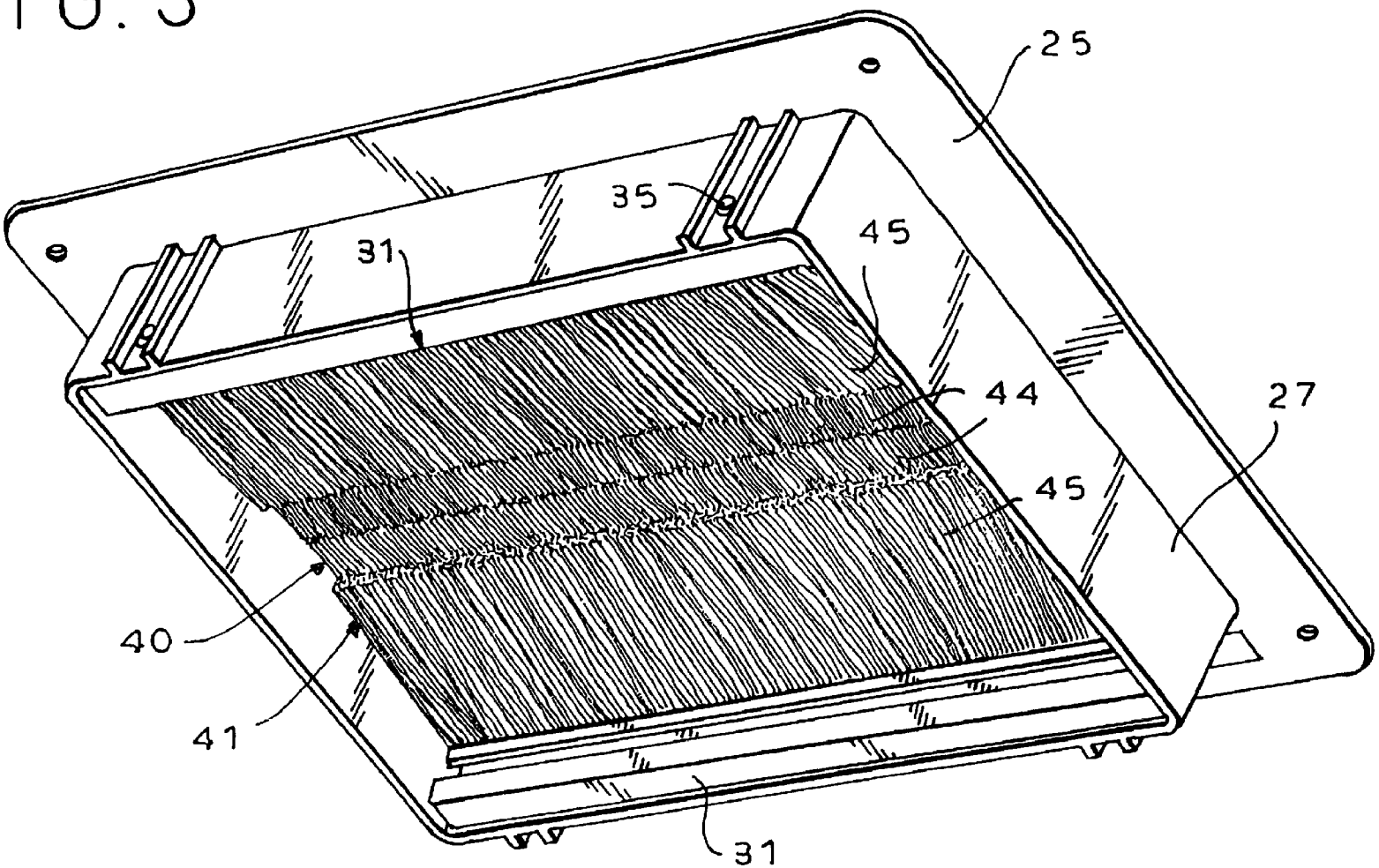
FIG. 3 is a bottom perspective view of the floor grommet of FIG. 2.

As shown in FIGS. 3 and 5 in particular, the lower bristle assemblies 41 preferably are comprised of bristles 45 of a length shorter than the bristles 44 of the upper assemblies 40. The lower bristles thus terminate a short distance, for example, ⅝" or so, from the center line of the grommet opening. Additionally, upper and lower bristle assemblies are convergently disposed, preferably by mounting the lower assemblies 41 with an upward incline, such that the ends of the lower bristles 45 make contact with outer portions of the upper bristles 44.

When a cable is passed through the grommet opening 26, bristles 44 of the upper bristle assemblies are displaced laterally to accommodate the presence of the cable in the opening. The individual bristles, being mounted in cantilever fashion by the backbone structures 42-43, bend laterally at their outer ends and close together a short distance away from the cable. The displacement of the bristles necessarily leaves a small V-shaped opening between the body of the cable and the point where the bristles merge together. In the grommet structure of the present invention, these small V-shaped openings are greatly minimized by the presence of the lower bristle assemblies 41 will have been displaced to a lesser extent, and in many cases not at all. In the illustration of FIG. 5, for example, a cable 46 of modest diameter can be passed through the grommet by laterally displacing the ends of the upper bristles 44, without displacing the bristles 45 of the lower assemblies. The lower bristles 45 thus tend to partially close off and thus minimize any small openings adjacent to cable 46 resulting from lateral displacement of the upper bristles 44. Additionally, in the case of cables of larger diameter, sufficient to result in lateral displacement of the lower bristles 45, it will be understood that the displacement of the lower bristles is significantly less than that of the upper bristles, so that the two sets of bristle assemblies, working in combination with each other, greatly minimize any openings for the passage of conditioned air.

It is contemplated that the bristle assemblies may be provided in more than two layers if desired. Likewise, it may be feasible to construct a single composite bristle structure employing tiers of bristles of different lengths. Likewise it may be possible to form at least some of the tiers with materials other than bristles or filaments, for example, panels of material slit to form narrow strips, panels of soft foam material, etc.

Where the grommet of the invention is installed in the center of a floor tile 20, as reflected in FIG. 1, the downwardly projecting rib 28 will be omitted. In some cases, however, it is desired to position the grommet along an edge of the floor tile. In such a case, the floor tile may be formed with an open sided cut-out, as indicated by broken line 50 in FIG. 1. The grommet frame will then be installed in a manner to position the projecting rib 28 at the open side of the cut-out 50, to rest upon a support element 51 under the edge of the floor tile.

A modified form of the new floor grommet structure, shown in FIGS. 7-10, is designed for easy retrofit installation in an existing floor. In the modified device, a frame 60, comprised of two parts 61-62, is arranged with flange portions 63-64 secured to mounting panels 65-66. The frame parts 61-62 include upwardly extending flange portions 67-68 and inwardly projecting flange portions 69-70. The inwardly extending flanges 69-70 define the grommet opening.

Each of the frame sections 61-62 mounts a pair of upper and lower bristle sets, of which only the upper sets 71-72 are visible in the drawings. It will be understood, however, that the arrangement of the bristle sets in the device of FIGS. 7-10 is similar to that shown in FIG. 5.

A preferred method for installing the retrofit unit of FIGS. 7-10 is by means of adhesive applied to the undersurfaces of the mounting panels 65-66. Each of the adhesively coated panels is provided with a release paper 73-74, which may be pulled away to expose the adhesive. Typically, the unit 62 will be positioned over a floor tile opening, and the release paper 74 then pulled out from under it, to allow the adhesive to contact the surface of the floor tile. The second section 61 is then positioned immediately adjacent to the section 62, and the release paper 73 is pulled out from under it, to expose the adhesive of the second component to the floor tile.

Figure 9:
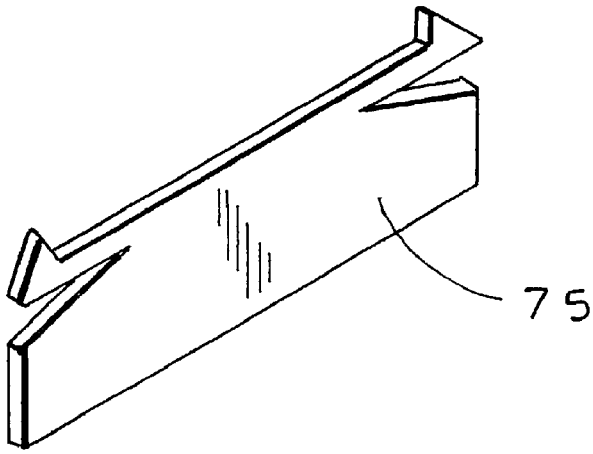
FIG. 9 is a perspective view of a locking element advantageously utilized with the retrofit unit of FIG. 7.

Desirably, mechanical locking tabs 75, shown in FIG. 9, are inserted in recesses 76-77 provided in each of the frames 61-62, so that the two sections are mechanically locked together as well as being secured by adhesive means.

Figure 10:
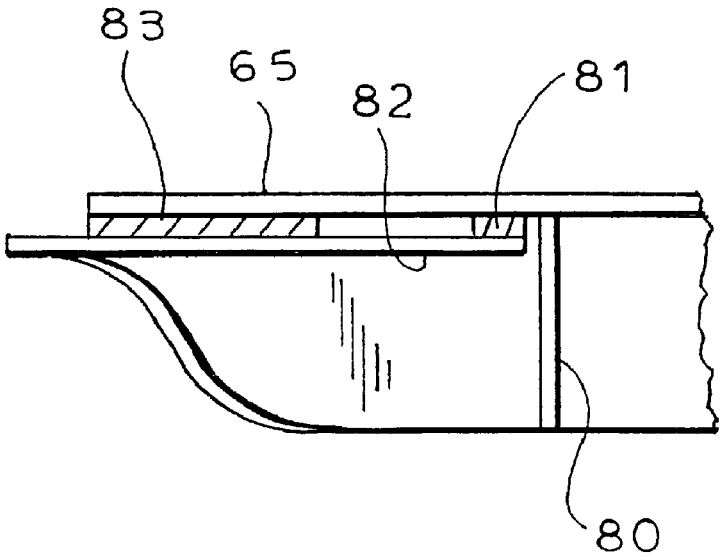
FIG. 10 is a fragmentary cross-sectional view illustrating a marginal edge portion of the retrofit unit of FIG. 7 installed in a floor tile unit.

In a typical retrofit installation, a pre-cut cable opening in the floor tile will have been lined by a plastic floor dressing 80, shown in FIG. 10. Typically, this will include a flange 81 supported on the top surface of the floor tile 82. To accommodate the thickness of the flange 81, the edge margins of the mounting plates 65-66 advantageously are provided with a layer 83 of foam material, with the adhesive being applied to the downwardly facing surface of such material.

The retrofit unit of FIGS. 7-10 can be installed in an existing cable opening having previously installed cables passing through. It is not necessary to interrupt service by unplugging the cables because the retrofit grommet device can be installed around the existing cables.

The retrofit unit of FIGS. 7-10 can also be employed to advantage for sealing of an opening which is located immediately adjacent a side wall of the room. In such a case, only one half of the two-part unit is employed, that is either one of the panels 65, 66. The panel is installed tightly against the side wall, with the free ends of the bristles engaging the side wall, allowing the cable to pass through the opening closely adjacent to the side wall.

In certain instances, it may be desirable to provide the floor grommet with centering guide means, positioned in the lower portions of the grommet, to urge cables passing through the grommet toward the center of the grommet opening such that the cables pass more or less symmetrically between the opposed sets of flexible elements. An advantageous form of such guide means may be resilient plastic or rubber vanes 90, shown in broken lines in FIG. 5. The vanes 90 can be anchored in the lowermost channels 39 of the multi-channel extrusion, extending therefrom to the center of the grommet opening and advantageously substantially meeting edge to edge along the longitudinal center line of the grommet opening. The vanes 90 have sufficient stiffness to urge cables toward a centered position between them. Because of that stiffness, however, the vanes 90 normally will not close effectively around the cables and thus by themselves do not form an effective cable seal. However, that function is taken care of by the bristle assemblies 40-41 as previously described. When no cable is present in the grommet opening, however, the resilient vanes 90 can close tightly at the center and form a complete seal of the grommet opening.

The new floor grommet arrangement provides very important economic and other advantages in the operation of high density data centers and of office buildings in which conditioned air is provided by an under floor plenum arrangement. One such advantage is the significant reduction of required air conditioning capacity to service an area of given heat load. With the new system, the uncontrolled loss of conditioned air through floor openings is reduced to a small fraction of normal experience, which translates directly into decreased capital requirements for air conditioning equipment, as well as to significant reductions in operating cost required to deliver the conditioned air.

Additionally, and importantly, the system of the invention also provides greater assurance that the cooling air provided will be directed to the areas where it is needed and discharged in the manner intended. For data centers, this assures that system outages from localized overheating problems are greatly minimized or eliminated. Among other things, this makes it possible to increase the density of computer equipment installed in a given space. For office buildings using under floor delivery of conditioned air, it becomes practical to operate at a higher overall ambient with equivalent comfort because a higher proportion of the conditioned air is delivered with a swirling effect in the manner intended by the HVAC engineers.

It will be understood, of course, that the invention is not limited to the specific structures illustrated and described and that the inventive concepts expressed herein can be incorporated into other embodiments.

We claim:

[1. In combination with a floor structure, where the floor structure comprises an elevated floor surface providing under-floor space for wiring and serving as a plenum for supplying conditioned air, and where said elevated floor surface is provided with first openings for directing conditioned air into the space above the floor surface and with cable openings for passing cabling from the under floor space to the space above, a floor grommet comprising (a) a frame of a size and shape to be received in a cable opening in said floor surface, (b) said frame forming a lining for guiding and protecting cabling passing through said cable opening, (c) at least one sealing member mounted in said frame, (d) said sealing member comprising a large plurality of filamentary elements anchored in cantilever fashion at inner ends thereof in said frame and extending into said frame opening to form a substantial air seal to resist the flow of conditioned air through said frame opening, and (e) said filamentary elements being individually flexibly displaceable at outer ends thereof to accommodate the presence of cabling passing through said frame opening.]

[2. The combination according to claim 1, wherein (a) said frame has first and second opposing sides spaced apart from each other and defines a frame opening of closed configuration;

(b) said at least one sealing member and a second sealing members are mounted in said opposing sides of said frame and extend toward each other, (c) outer end portions of the respective sealing members meeting between said opposing sides and defining a sealing line, and (d) said cabling passing through said opening adjacent said sealing line.]

[3. The combination according to claim 2, wherein (a) said sealing members are both comprised of a large plurality of filamentary elements anchored at one end thereof and with respective free ends thereof extending toward and substantially into contact with each other to form said sealing line.]

[4. In combination with a floor structure, where the floor structure comprises an elevated floor surface providing under-floor space for wiring and serving as a plenum for supplying conditioned air, and where the said elevated floor surface is provided with first openings for directing conditioned air into the space above the floor surface and with cable openings for passing cabling from the under floor space to the space above, a floor grommet comprising (a) a frame of a size and shape to be received in a cable opening in said floor surface, (b) said frame forming a lining for guiding and protecting cabling passing through said cable opening, (c) upper and lower sealing members mounted in said frame, (d) one of said sealing members being easily displaceable by a cable passing through said opening, (e) the other of said sealing members serving to position said cable to assist in limiting displacement of said one sealing member by said cable.]

[5. A combination according to claim 4, wherein (a) said frame is formed with a recess in an upper, inner portion thereof, and (b) a cover plate is receivable in said recess to fully close said floor opening.]

[6. In combination with a floor structure, where the floor structure comprises an elevated floor surface providing under-floor space for wiring and serving as a plenum for supplying conditioned air, and where the floor surface is provided with first openings for directing conditioned air into the space above the floor surfaces and with cable openings for passing cabling from the under floor space to the space above, a floor grommet adapted particularly for retrofit installation, comprising (a) a frame of a size and shape to be received in a cable opening in said floor surface, (b) said frame being formed in two parts which, when joined, define an opening of substantially closed configuration substantially lining edges of said cable opening, (c) each of said frame parts mounting a large plurality of thin, flexible, filamentary sealing elements, anchored at one end thereof in the frame part and extending in a direction toward similar filamentary sealing elements mounted in the other frame part, (d) said filamentary sealing elements, when said frame parts are joined, closing the opening defined by said frame parts while accommodating the passage of cables or the like through said opening.]

[7. A floor grommet for data centers, air conditioned offices, and like structures, where the structures comprise elevated floor surfaces providing under floor space for wiring and serving as a plenum for supplying conditioned air, and where the floor surfaces are provided with openings for directing conditioned air into the space above the floor surfaces and with openings for passing cabling from the under floor space to the space above, said floor grommet comprising (a) a frame of a size and shape to be received in a cable opening in said floor surface, (b) said frame forming a lining for guiding and protecting cabling passing through said floor opening, (c) at least one sealing member mounted in said frame, (d) said sealing member comprising a large plurality of filamentary elements anchored in cantilever fashion at inner ends thereof in said frame and extending into said frame opening to form a substantial air seal to resist the flow of conditioned air through said frame opening, (e) said filamentary elements being individually flexibly displaceable at outer ends thereof to accommodate the presence of cabling passing through said frame opening, (f) said frame having first and second opposing sides spaced apart from each other and defining a frame opening of closed configuration, (g) first and second sealing members mounted in said opposing sides of said frame and extending toward each other, (h) outer end portions of the respective first and second sealing members meeting between said opposing sides and defining a sealing line, (i) said cabling passing through said opening adjacent said sealing line, and (k) said first and second sealing members comprising a large plurality of filamentary elements anchored at one end thereof and with respective free ends thereof extending toward and substantially into contact with each other to form said sealing line, and (l) third and fourth sealing members mounted in said opposing frame sides, substantially directly underneath said first and second sealing members, (b) said third and fourth sealing members being mounted at one side thereof in said respective frame sides and being formed of flexible material.]

[8. A floor grommet according to claim 7, wherein (a) said third and fourth sealing members are formed of flexible filamentary elements anchored at an inner end thereof in said frame and extending toward said sealing line.]

[9. A floor grommet according to claim 8, wherein (a) outer ends of the filamentary elements of said third and fourth sealing members terminate in spaced relation to each other and spaced from said sealing line whereby a cable passing between said floor grommet will tend to displace filamentary elements of said third and fourth sealing members a lesser amount than filamentary elements of said first and second sealing members.]

[10. A floor grommet according to claim 7, wherein (a) said third and fourth sealing members are formed of non-filamentary flexible material.]

[11. A floor grommet according to claim 7, wherein (a) said third and fourth sealing members are disposed at a convergent angle to said first and second sealing members, and (b) outer end portions of said third and fourth sealing members contact lower portions of said first and second sealing members.]

[12. A floor grommet for data centers, air conditioned offices, and like structures, where the structures comprise elevated floor surfaces providing under floor space for wiring and serving as a plenum for supplying conditioned air, and where the floor surfaces are provided with openings for directing conditioned air into the space above the floor surfaces and with openings for passing cabling from the under floor space to the space above, said floor grommet comprising (a) a frame of a size and shape to be received in a cable opening in said floor surface, (b) said frame forming a lining for guiding and protecting cabling passing through said floor opening, (c) upper and lower sealing members mounted in said frame, (d) one of said sealing members being easily displaceable by a cable passing through said opening, (e) the other of said sealing members serving to position said cable to assist in limiting displacement of said one sealing member by said cable, (f) said upper and lower sealing members each comprising an opposed pair of sealing elements, and (g) at least one of said opposed pairs, comprising said at least one of said sealing members, is comprised of a plurality of thin flexible elements.]

[13. A floor grommet according to claim 12, wherein (a) the other of said opposed pair of sealing elements, comprising said other sealing member, is formed of vanes of plastic or rubber material.]

[14. A floor grommet according to claim 12, wherein (a) the other of said opposed pair of sealing elements, comprising said other sealing member, is formed of a plurality of thin flexible elements.]

[15. A floor grommet according to claim 14, wherein (a) wherein said thin flexible elements, of at least one of said opposed pairs of sealing elements, comprises thin, flexible filamentary elements.]

[16. A floor grommet adapted particularly for retrofit installation in data centers, air conditioned offices, and like structures, where the structures comprise elevated floor surfaces providing under floor space for wiring and serving as a plenum for supplying conditioned air, and where the floor surfaces are provided with openings for directing conditioned air into the space above the floor surfaces and with openings for passing cabling from the under floor space to the space above, said floor grommet comprising (a) a frame of a size and shape to be received in a cable opening in said floor surface, (b) said frame being formed in two parts which, when joined, define an opening of substantially closed configuration substantially lining edges of said cable opening, (c) each of said frame parts mounting a plurality of thin flexible sealing elements, anchored at one end thereof in the frame part and extending in a direction toward similar sealing elements mounted in the other frame part, (d) said sealing elements, when said frame parts are joined, closing the opening defined by said frame parts while accommodating the passage of cables or the like through said opening, and (e) each of said frame parts mounting two sets of said thin flexible sealing elements, one above the other and having contact with each other in outer portions of said elements.]

*17. The combination of an enclosure defining in part a space for service elements and defining a plenum confining and controlling a flow of conditioned air under elevated pressure, said enclosure including at least one first opening directing a flow of conditioned air into a space outside of said enclosure, and including at least one second opening, separate from said first opening, passing at least one service element, and a grommet associated with said second opening, where the grommet comprises*

*(a) a frame defining a frame opening and of a size and shape to be received in said second opening in said enclosure,*

(b) *said frame being positioned in said second opening and forming a lining guiding and protecting a service element passing through said second opening,*

(c) *at least one first sealing member mounted in said frame,*

(d) *said first sealing member comprising a large plurality of filamentary elements anchored in cantilever fashion at inner ends thereof in said frame and extending into said frame opening to resist a flow of conditioned air through said frame opening, and*

(e) *said filamentary elements being individually flexibly displaceable at outer ends thereof to accommodate the presence of said service element passing through said frame opening.*

*18. The combination according to claim 17, wherein*

(a) *said frame has first and second opposing sides spaced apart from each other and defines a frame opening of closed configuration,*

(b) *said first sealing member and a second sealing member are mounted in said opposing sides of said frame and extend toward each other,*

(c) *outer end portions of said first and second sealing members meet between said opposing sides and define a sealing line, and*

(d) *said service element passes through said frame opening at or adjacent said sealing line.*

*19. The combination of an enclosure defining in part a space for service elements and serving as a plenum for confining and controlling a flow of conditioned air under elevated pressure, said enclosure including at least one first opening for the directed flow of conditioned air, and including at least one second opening, separate from said first opening, for passing at least one service element, and a grommet, where the grommet comprises*

(a) *a frame of a size and shape to be received in said second opening,*

(b) *said frame being positioned in said second opening and forming a lining for guiding and protecting a service element passing through said second opening,*

(c) *upper and lower sealing members mounted in said frame,*

(d) *one of the upper and lower sealing members serving to resist a flow of conditioned air through said second opening and being easily displaceable by a service element passing through said frame opening,*

(e) *an other of the upper and lower sealing members serving to position said service element to assist in limiting displacement of said one of the upper and lower sealing members by said service element.*

*20. The combination of an enclosure defining in part a space for service elements and defining a plenum confining and controlling a flow of conditioned air under elevated pressure, said enclosure including at least one first opening directing a flow of conditioned air, and including at least one second opening, separate from said first opening, passing at least one service element, and a grommet, where the grommet comprises*

(a) *a frame of a size and shape to seal said second opening in said enclosure, and said frame being disposed in sealed relation to said second opening,*

(b) *said frame being formed in a plurality of frame parts which, when joined, define a frame opening,*

(c) *a first one of said frame parts mounting a large plurality of thin, flexible, filamentary sealing elements, anchored at one end thereof in the first one of said frame parts and extending in a direction toward similar filamentary sealing elements mounted in a second one of said frame parts,*

(d) *said filamentary sealing elements, when said first and second frame parts are joined, closing the frame opening defined by said frame parts to resist a flow of conditioned air through said frame opening while accommodating the passage of said service element through said frame opening.*

*21. A grommet adapted particularly for retrofit installation in data centers, air conditioned offices, and like structures, where the structures include an enclosure defining a space for service elements and serving as a plenum for confining and controlling a flow of conditioned air, and wherein said enclosure includes at least one first opening for directing the flow of conditioned air and at least one second opening for passing at least one service element, said grommet comprising*

(a) *a frame of a size and shape to be received in sealed relation with the second opening in said enclosure,*

(b) *said frame being formed in a plurality of frame parts which, when joined, define a frame opening of closed configuration,*

(c) *an opposed pair of said frame parts mounting a large plurality of thin, flexible, filamentary sealing elements, anchored at one end thereof in a frame part and extending in a direction toward similar filamentary sealing elements mounted in an opposed frame part,*

(d) *said filamentary sealing elements, when said frame parts are joined, closing the frame opening defined by said frame parts to resist a flow of conditioned air through said frame opening while accommodating the passage of a service element through said frame opening, and*

(e) *each of said opposed frame parts mounting an upper set and a lower set of said thin flexible sealing elements convergently disposed one above the other such that said lower set has contact with the upper set mounted in the same frame part in outer portions of said sealing elements.*

*22. A grommet for data centers, air conditioned offices, and like structures, where the structures comprise an enclosure providing space for service elements and serving as a plenum for supplying conditioned air, and wherein said enclosure is provided with at least one opening for directing conditioned air and at least a second opening for passing at least one service element, said grommet comprising*

(a) *a frame of a size and shape to be received in the second opening in said enclosure,*

(b) *said frame forming a lining for guiding and protecting service elements passing through said second opening,*

(c) *said frame having first and second opposing sides spaced apart from each other and defining a frame opening of closed configuration,*

(d) *first and second sealing members mounted in said opposing sides of said frame and extending toward each other,*

(e) *outer end portions of the respective first and second sealing members meeting between said opposing sides and defining a sealing line,*

(f) *a service element passing through said frame opening at or adjacent said sealing line, and*

(g) *said first and second sealing members comprising a large plurality of filamentary elements anchored at one end thereof and with respective free ends thereof extending toward and substantially into contact with each other to form said sealing line to resist a flow of conditioned air through said second opening, and*

(h) *third and fourth sealing members mounted in said opposing frame sides, underneath said first and second sealing members,*

(i) *said third and fourth sealing members being mounted at one side thereof in said respective frame sides and being formed of flexible material.*

*23. A grommet according to claim 22, wherein*

(a) *said third and fourth sealing members are formed of flexible filamentary elements anchored at an inner end thereof in said frame and extending toward said sealing line.*

*24. A grommet according to claim 23, wherein*

(a) *outer ends of the filamentary elements of said third and fourth sealing members terminate in spaced relation to each other and spaced from said sealing line whereby a service element passing through said grommet will tend to displace filamentary elements of said third and fourth sealing members a lesser amount than filamentary elements of said first and second sealing members.*

*25. A grommet according to claim 22, wherein*

(a) *said third and fourth sealing members are formed of non-filamentary flexible material.*

*26. A grommet according to claim 22, wherein*

(a) *said third and fourth sealing members are disposed at a convergent angle to said first and second sealing members, and*

(b) *outer end portions of said third and fourth sealing members contact lower portions of said first and second sealing members.*

*27. A grommet for data centers, air conditioned offices, and like structures, where the structures comprise an enclosure providing space for service elements and serving as a plenum for supplying conditioned air, and wherein said enclosure is provided with at least one first opening for directing conditioned air and with at least one a second opening for passing at least one service element, said grommet comprising*

(a) *a frame of a size and shape to be received in the second opening,*

(b) *said frame forming a lining for guiding and protecting service elements passing through said second opening,*

(c) *upper and lower sealing members mounted in said frame,*

(d) *one of said sealing members serving to resist a flow of conditioned air through said second opening and being easily displaceable by a service element passing through said second opening,*

(e) *the other of said sealing members serving to position said service element to assist in limiting displacement of said one sealing member by said service element,*

(f) *said upper and lower sealing members each comprising an opposed pair of sealing elements, and*

(g) *at least one of said opposed pairs, comprising said one of said sealing members, is comprised of a plurality of thin flexible elements.*

*28. A grommet according to claim 27, wherein*

(a) *the other of said opposed pair of sealing elements, comprising said other sealing member, is formed of vanes of plastic or rubber material.*

*29. A grommet according to claim 27, wherein*

(a) *the other of said opposed pair of sealing elements, comprising said other sealing member, is formed of a plurality of thin flexible elements.*

*30. A grommet according to claim 29, wherein*

(a) *said thin flexible elements, of at least one of said opposed pairs of sealing elements, comprises thin, flexible filamentary elements.*

*31. The combination of an enclosure defining in part a space for service elements and defining a plenum confining and controlling a flow of conditioned air under elevated pressure, said enclosure including at least one first opening for the directed flow of conditioned air, and including at least one second opening, separate from said first opening, for passing at least one service element, and a grommet comprising*

(a) *a frame of a size, shape and arrangement to be positioned in generally sealed relation to said second opening,*

(b) *said frame defining a frame opening,*

(c) *a first sealing member mounted in said frame,*

(d) *said first sealing member comprising a large plurality of filamentary elements anchored in cantilever fashion at inner ends thereof in said frame and extending into said frame opening to resist a flow of conditioned air through said frame opening,*

(e) *said filamentary elements being individually flexibly displaceable at outer ends thereof to accommodate the presence of a service element passing through said frame opening, and*

(f) *said grommet being positioned in generally sealed relation to said second opening.*

*32. The combination according to claim 31, wherein*

(a) *said frame is formed with a recess in an outer surface portion thereof surrounding said frame opening, and*

(b) *a cover plate is receivable in said recess to fully close said frame opening in the absence of service elements passing through said frame opening.*

*33. The combination according to claim 31, wherein*

(a) *said frame has first and second opposing sides spaced apart from each other and defines a frame opening of closed configuration,*

(b) *said first sealing member and a second sealing member are mounted in said opposing sides of said frame and extend toward each other,*

(c) *outer end portions of the respective sealing members meet between said opposing sides and define a sealing region, and*

(d) *said service element passes through said frame opening at or adjacent said sealing region.*

*34. The combination according to claim 33, wherein*

(a) *said first and second sealing members are both comprised of a large plurality of filamentary elements anchored at one end thereof and with respective free ends thereof extending toward and substantially into abutting contact with each other to form said sealing region.*

*35. The combination according to claim 31, wherein said service element is a cable.*

* * * * *